United States Patent Office 2,791,092
Patented May 7, 1957

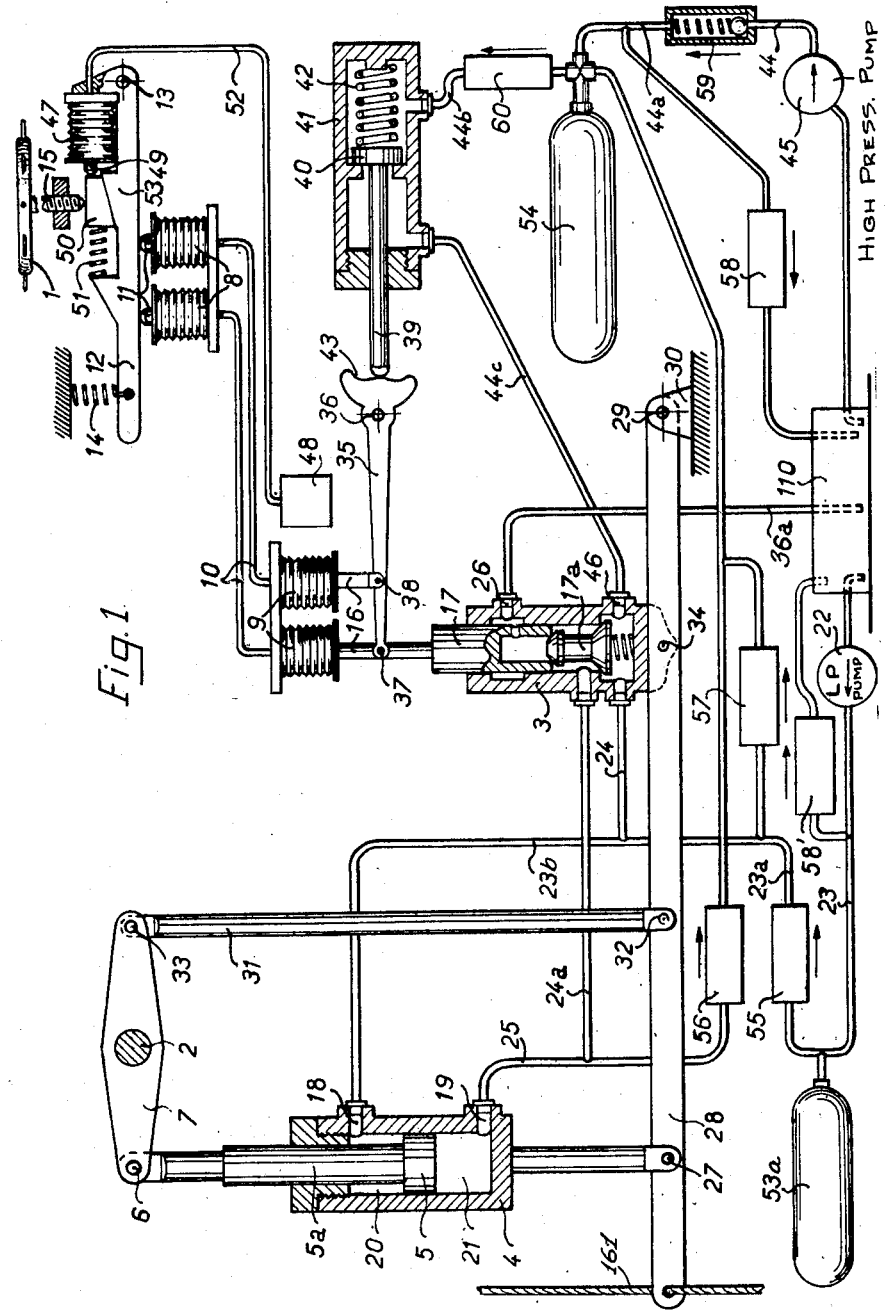

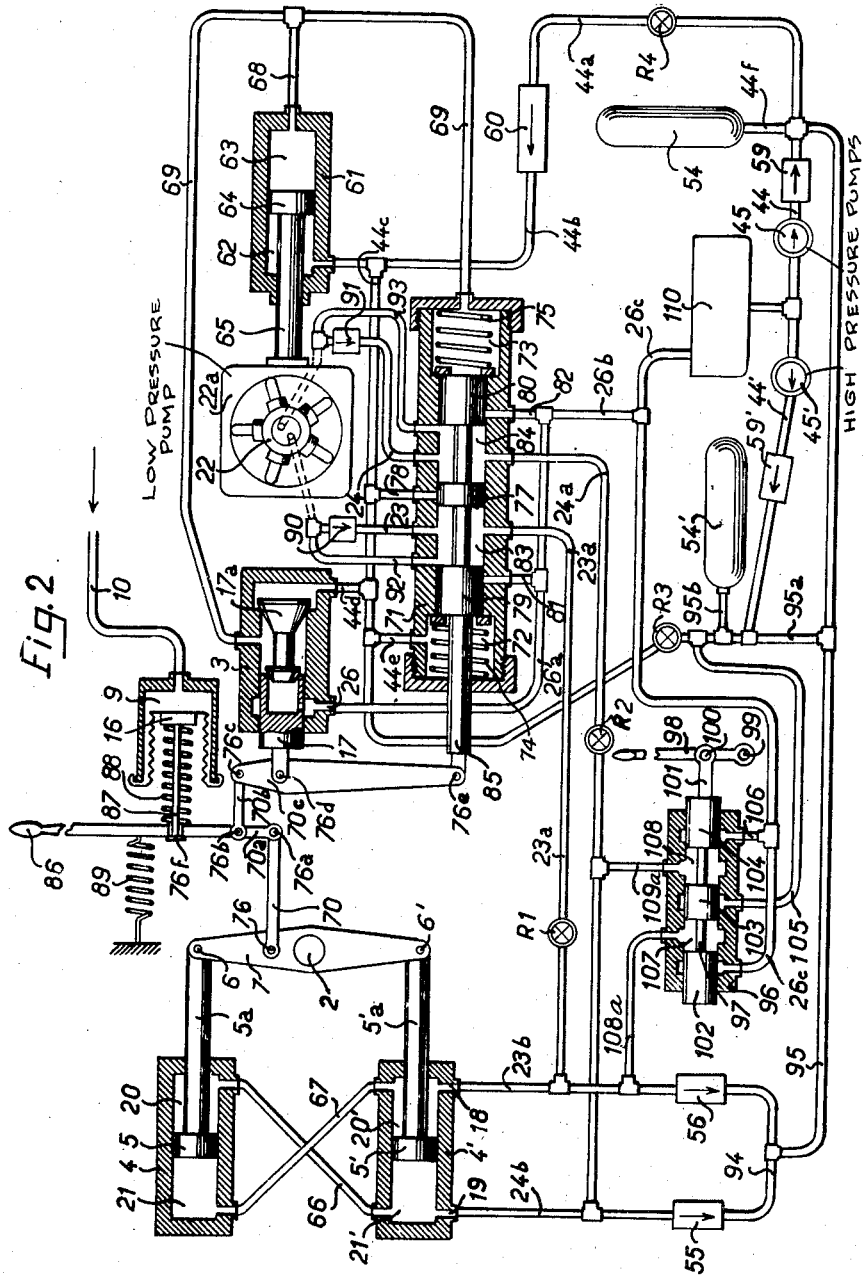

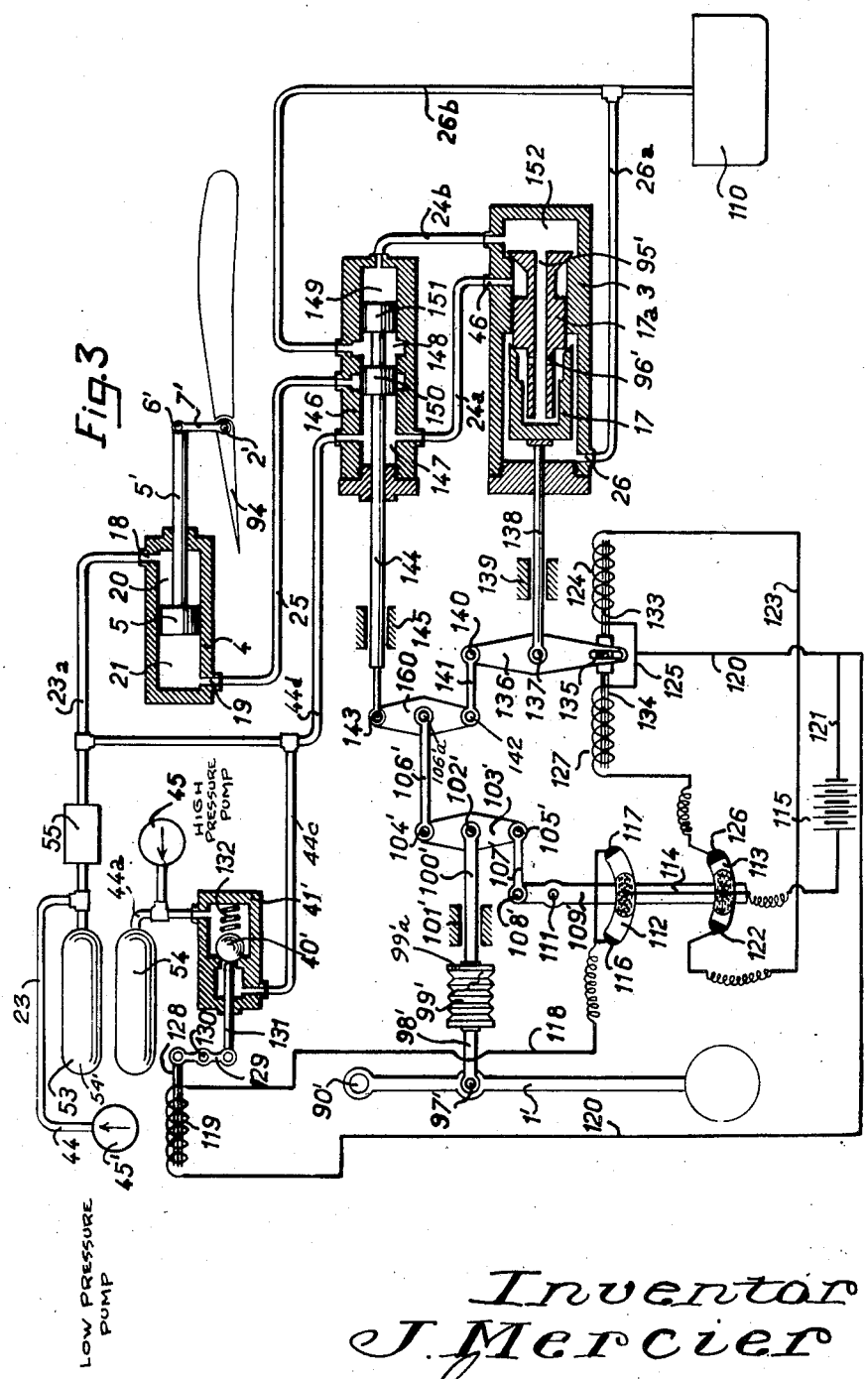

2,791,092

HYDRAULIC FOLLOW-UP SYSTEMS

Jean Mercier, New York, N. Y.

Application July 7, 1952, Serial No. 297,461

11 Claims. (Cl. 60—51)

This invention relates to hydraulic follow-up systems, in particular of the type interposed between two pivoted members for transmitting an angular shift from one to the other of said members.

Still more particularly, the invention refers to such hydraulic systems for imparting a control surface, such as a rudder or a flap of an air or water craft called hereafter indifferently "craft," with an angular shift for steering or stabilizing said craft.

The rudder of a craft has to assume two different and well defined functions, viz.:

1. What could be called a permanent function which is to keep the craft on a given head or direction; this is obtained by imparting the rudder with a succession of small angular displacements on either side of a mean or neutral position;

2. What could be called an occasional function which is to ensure important or rapid changes of direction; this is obtained by imparting a considerable angular shift to the rudder.

Now, it is obvious that the first function requires far less power than the second one.

In the known hydraulic follow-up systems used heretofore for acting upon the rudder of a craft, both aforesaid functions have been ensured with the same source of pressure fluid, which constitutes an enormous waste of power, since this arrangement requires permanently the use of a high pressure source which is necessary only in occasional cases.

The main object of the invention is to provide a hydraulic follow-up system normally actuated by a normal working pressure fed from a low pressure (L. P.) source and in which a high pressure (H. P.) source corresponding to that heretofore used for the same purposes is only set into action in a few occasional cases when said low pressure is not sufficient; this arrangement has the advantage of suppressing the above mentioned waste of power of the known systems.

Another object of the invention is to provide such a hydraulic follow-up system with means for automatically switching on the H. P. source when required and automatically switching off said source when its use is no more necessary.

Now, the pressure required to impart a rudder with an angular shift is a function of several variables, the most important one of which is clearly the value of said angular shift itself.

In a first embodiment of the invention, the above-mentioned switching means are adapted to operate automatically for a given value of said angular shift.

However, in certain cases and, in particular, in heavy crafts, other variables such as the speed of the craft and the response time of the rudder are very important. The best way to take into account all variables is to consider the resistance opposing the angular shift of the rudder as well as said angular shift.

In a second embodiment of the invention, the above-mentioned H. P. switching means are adapted to operate automatically when the resisting torque on the rudder takes a given value.

As already mentioned, the invention is not limited to steering but may be also used for stabilizing a craft.

In this particular application, the automatic control of the feeding pressure is ensured directly from a pendulum system.

In stabilizing applications, it is obvious that the speed at which the control surface is shifted plays a particularly important part.

A further object of the invention is to provide a stabilizing hydraulic follow-up system of the type described, comprising means for introducing the value of said speed in the automatic control of the H. P. switching.

Other objects and advantages of the invention will be apparent from the following detailed description, together with the accompanying drawing, submitted for purposes of illustration only and not intended to define the scope of the invention, reference being had for that purpose to the subjoined claims.

In these drawings:

Fig. 1 shows diagrammatically a first embodiment of the hydraulic follow-up system according to the invention in which the high pressure is fed only when the shift angle of the rudder exceeds a given value.

Fig. 2 shows in the same manner another embodiment in which the switching of the high pressure is effected as a function of the reaction torque of the rudder.

Fig. 3 shows in a more detailed form, an alternative embodiment to be used for stabilizing a craft under the control of a pendulum.

In the example shown in Fig. 1, 1 is a steering-wheel, the angular displacements of which are to be reproduced by the shaft 2 of a rudder. For this purpose, a follow-up system in interposed between said steering-wheel and rudder shaft, said system essentially comprising a three-way distributor 3, preferably without backlash described in detail hereunder with reference to Fig. 3, adapted to control the feeding of pressure fluid into a differential jack 4, the piston 5 of which is articulated at 6 on the swing-bar 7 of the rudder. The transmission of the control from steering-wheel 1 to distributor 3 is ensured by liquid connecting-links comprising a set of controlling diaphragms 8, as a set of receiving diaphragms 9 and transmission ducts 10 between said controlling and receiving diaphragms. The movable members 11 of the controlling diaphragms are actuated from steering-wheel 1 through a lever 12 articulated at 13 on a fixed part and urged by a spring 14 into contact with the free end of a screw 15 rotatively fast with steering-wheel 1. The movable members 16 of the receiving diaphragms 9 are linked with the sliding control member 17 of distributor 3. With this arrangement, any angular displacement of the steering-wheel 1 on either side of its neutral position shown in Fig. 1 determines a relative axial displacement of the sliding control member 17 with respect to the body of distributor 3 in a well-defined direction with respect to its neutral relative position shown in Fig. 1.

Now, the cylinder of the differential jack 4 is provided with two ports 18 and 19 communicating with the spaces 20 and 21 respectively, on either side of piston 5. Due to presence of piston-rod 5a, space 20 is annular and the area of piston 5 which is acted upon by the pressure in said space 20 is smaller than the circular face of piston 5 which is acted upon by the pressure in space 21. Thus, when the same pressure is built up in both spaces 20 and 21, piston 5 will be displaced upwards (with reference to Fig. 1).

Port 18 is continuously fed with a L. P. fluid from a pump 22 through ducts 23, 23a, 23b, while port 19 may be also fed from said pump through a duct 24 connected with duct 23a, distributor 3 and ducts 24a, 25. In the neutral position shown in Fig. 1, the sliding member 17 of distributor 3 interrupts communication between ducts 24 and 24a, so that only space 20 of the differential jack 4 is fed while the other space 21 thereof is closed. In these conditions, piston 5 remains stationary. When the sliding members 17—17a of distributor 3 are moved downwards under the control of steering wheel 1, duct 24 is set into communication with ducts 24a—25, so that both spaces 20 and 21 are fed, which determines an upward displacement of piston 5, as explained above. Conversely, if the sliding member 17 is displaced upwards, ducts 25—24a are set into communication with the discharge outlet 26 of distributor 3 and, thence, through a duct 36a, with the tank 110. In these conditions, piston 5 is free to move downwards under the action of the pressure in space 20.

The circular area on the lower side of piston 5 is preferably equal to twice the annular area on the upper side of said piston so that both upward and downward actions are equivalent for a given value of the pressure fed from pump 22.

According to the invention, the cylinder of the differential jack 4 is articulated at 27 on a lever 28 pivoted at 29 on a stationary part 30, while a reaction connecting-rod 31 is articulated at one end as shown at 32 on lever 28 and at its other end as shown at 33 on the end of the swinging-arm 7 diametrically opposed for the articulation 6 of piston-rod 5a. This arrangement has for its purpose to relieve the bearings of shaft 2 from the major portion of the reaction stresses applied to such shaft, while the remaining reaction torque is used to compensate the objectionable looseness of the articulations. Now, the body of distributor 3 is also articulated on lever 28 as shown at 34, the arrangement being such as to bring the control members 17—17a and the body of distributor 3 into neutral relative position again, when the order given by steering wheel 1 has been followed up by the rudder.

According to the invention, a cam lever 35 pivoted at 36 on a stationary part is articulated as shown at 37, 38, on the mechanical link between the movable members 16 of the receiving diaphragms 9 and the control member 17 of the distributor 3. A rod 39 rigid with the movable member 40 of a valve 41 is continuously held by a spring 42 in contact with the cam surface 43 of the lever 35. The valve 41 is fed through ducts 44—44a—44b from a H. P. pump 45 and communicates through a duct 44c with an inlet 46 into distributor 3; inlet 46 continuously communicates with duct 24 leading to the upper space 20 of the differential jack 4, while said inlet 46 may be set into communication with ducts 24a—25 leading to the lower space 21 of said jack, when the control member 17a of the distributor 3 is moved downwards.

Now, the cam surface 43 is so designed that when the lever 35 is shifted by a given angle with respect to its neutral position shown in Fig. 1, which angle corresponds to a given angular shift imparted to the steering-wheel with a view to cause a predetermined corresponding shift of the rudder, the low-pressure fluid being considered as uncapable of producing such shift, rod 39 opens valve 41 thus either feeding space 20 with H. P. while setting space 21 into exhaust conditions or feeding both spaces 20 and 21 with H. P. according as whether the shift of lever 35 is directed upwards or downwards. It goes without saying that the differential jack is then operated exactly as described above for L. P. feeding.

To compensate for changes of temperature capable of modifying the length of the liquid connecting-links, there is provided an additional diaphragm 47 fed through duct 52 from an enclosed rigid tank 48 having substantially the same capacity as each of the receiving diaphragms and located in the vicinity thereof, the movable member 49 of diaphragm 47 acting upon a wedge 50 against the action of a compression spring 51. Wedge 50 cooperates with a similar wedge 53 supported on lever 12, both wedges being in sliding engagement along their slanted faces, so that their total thickness varies as a function of their relative position, which is controlled by the movable member 49 of diaphragm 47, as a function of the temperature acting upon tank 48. To clearly understand the operation of this compensating device, assume that, the element being in the position shown in Fig. 1, a rise of temperature takes place. The desired compensation consists in maintaining the receiving diaphragms 9 in their position in spite of said temperature rise; to this effect, since the length of the liquid columns increases, the movable members 11 of the controlling diaphragms 8 should necessarily move upwards; this is made possible by the shifting of the wedge 50 towards the left, due to extension of the diaphragm 47 due to said temperature rise, this left shifting producing a reduction of the thickness of the elements interposed between screw 15 and said movable members 11.

Each pump 22 and 45 is completed by an accumulator, 53a and 54, respectively, which, thanks to its very nature, permits reducing the rate of flow of the pump and constitutes a safety power stock for emergency. Suitable non-return valves are interposed in the various ducts as shown at 55, 56, 57, 59 and 60, one of them, 59, being drawn in section to show the details thereof. The non-return valves 56 and 57 have a particular function which is to permit a displacement of piston 5 in either direction e. g. under the action of exceptional and considerable outer hydrodynamic or aerodynamic stresses on the rudder, e. g. by heavy sea, so that said outer forces may be taken up by accumulator 54 which acts as a shock-absorber and in which a corresponding power is thereby recovered. 58 and 58' are safety valves calibrated at a given value higher than the H. P. pressure to protect the installation against over-pressures. Mechanical hand-controlled means such as a cable 161 may be provided as an additional safety.

In the embodiment of Fig. 2, the swing arm 7 of the rudder shaft 2 is actuated at both ends, as shown at 6 and 6', by two symmetric double acting jacks or fluid motors 4 and 4'. The annular space 20 of jack 4 communicate with the cylindrical space 21' of jack 4' through a duct 66. Similarly, the annular space 20' of jack 4' communicates with the cylindrical space 21 of jack 4 through another duct 67. In this embodiment, the L. P. source is constituted by a variable flow pump 22 connected with the ports 18 and 19 of jack 4' through ducts 23, 23a, 23b and ducts 24, 24a, 24b, respectively.

With this arrangement, it is clear that when pump 22 discharges in one way, L. P. fluid is fed into spaces 20' and 21, so that pistons 5' and 5 are moved respectively towards the left and the right of Fig. 2, while the fluid previously contained in spaces 20 and 21' is returned to pump 22, and vice versa when pump 22 discharges in the other way. When cage 22a and rotor 22 have their axes coinciding with one another, the pump does not discharge in either way and the four chambers of the jacks 4, 4' are full with static fluid, so that no action is exerted upon the swing arm 7.

The double-jack feature has the advantage of applying on shaft 2 a substantially pure torque since the piston rods 5a and 5'a act upon the diametrically opposed ends of the swing arm 7 with equal and opposite forces.

The shift of the axis of cage 22a and, thence the discharge rate and way of pump 22 are controlled by a pilot jack 61, the piston 64 of which is subjected to the differential action of the H. P. source, as exposed hereunder, said piston being interconnected with the output varying member of pump 22 through the usual piston-rod 65.

As previously, the H. P. source is constituted by a pump 45 and by an accumulator 54.

Independently of its actuating function exposed hereafter, the H. P. from source 45 is used in this embodiment as a pilot pressure for controlling the rate and way of flow from pump 22. For this purpose, pump 45 communicates through ducts 44—44a—44b with the annular space 62 of jack 61, while the cylindrical space 63 thereof can be put into communication with the same H. P. source 45 through ducts 68—69—44d—44c—44b—44a—44 under the control of distributor 3.

In the neutral position of distributor 3 shown in Fig. 2, corresponding to static conditions of the rudder as well as the steering-wheel, ducts 68—69 are closed by the sliding members 17, 17a of said distributor. The steering-wheel is provided with transmission means (not shown) which may be, for example, similar to those of Fig. 1, adapted to actuate the movable member 16 of a receiving diaphragm 9, said movable member 16 being linked with the sliding member 17 of the distributor 3.

As the sliding members 17—17a of distributor 3 are displaced towards the right, both spaces 62 and 63 are increasingly fed through the above described H. P. duct lines, so that the flow controlling member 22a of pump 22 is displaced towards the left. This displacement goes on as long as sliding members 17—17a are not brought into their neutral position again, which can be ensured by a linkage 70—70a—70b—70c from the swing arm 7 of the rudder, only when the order emitted from the steering-wheel has been completely carried out by said rudder. In these conditions, it will be easily understood that the value of the resisting torque opposing the shift of the rudder will determine the value of the variable pressure in chamber 63 acting against the constant pressure in chamber 62 and, thence, the rate of flow from pump 22.

Now, if the sliding member 17 of distributor 3 is moved towards the left, ducts 68—69 are set into communication with the outlet 26 of distributor 3 and, thence, through ducts 26a—26b—26c with the tank 110. Then, pump 22 begins to deliver in the other way, its rate of delivery being determined, as previously, as a function of the resisting torque encountered by the rudder.

Now, when pump 22 has reached its maximum rate of flow, if the above-mentioned resisting torque is so high that the order cannot be completely carried out by pump 22 for any reason, distributor 3 remains open, i. e. ducts 68—69 further communicate either with H. P. source 45 or with tank 110 according as whether the shift of the rudder is to take place in one direction or the other with respect to the neutral position.

According to the invention, a differential sliding valve 71 then switches on the H. P. source to overcome said resisting torque.

Said differential sliding valve 71 comprises a cylindrical body and a sliding member having three active portions 79, 77 and 80 dividing the inner space of said body into four chambers 72, 83, 84, 73 communicating continuously with ducts 44e, 23—23a, 24—24a, and 69, respectively. Springs 74, 75 housed in the end spaces 72, 73 respectively, normally urge the sliding member towards the neutral position shown in Fig. 2 in which the active portions 79, 77, 80 of said sliding member close a duct 81 communicating with duct 26a, a duct 78 communicating with duct 44c and duct 26b, respectively.

The differential end spaces 72, 73 are moreover fed with H. P. fluid in parallel with chambers 62 and 63 respectively, so that they are subjected to the same pressure conditions, but springs 74, 75 are so calibrated as to oppose the displacement of the sliding member of distributor 71 until the resisting torque on the rudder reaches a predetermined value. Then, assuming the sliding members of distributor 3 have been moved towards the right, the action of H. P. fluid on the circular area of the active portion 80 overcomes the combined action of H. P. fluid and spring 74 on the annular area of the active portion 79, so that the sliding member of distributor 71 is moved towards the left. The central active portion 77 then opens duct 78 so that H. P. fluid is fed into spaces 21', 20 as follows: H. P. pump 45, duct 44, 44a, 44B, 44c, 78, chamber 84, ducts 24a, 24b, port 19, space 21' and duct 66, space 20. Pistons 5' and 5 can then be moved towards the right and the left, respectively, since the active portion 79 has then opened duct 81, so that the fluid in spaces 20', 21 can be exhausted as follows: space 21, duct 67, space 20', port 18, ducts 23b, 23a, chamber 83, ducts 81, 26a, 26b, 26c, tank 110.

As pistons 5' and 5 move towards the right and the left respectively, the swing-arm 7 and, thence, the rudder, are rotated anti-clockwise, so that the linkage 70, 70a, 70b, 70c brings both sliding members 17, 17a into the neutral position shown in Fig. 2 when the order has been carried out. The elements of the linkage are articulated as follows: element 70 at 76 on the swing-arm 7, at 76a on element 70a; the latter at 76b on element 70b; the latter at 76c on element 70c and the latter at 76d on the sliding member 17 of distributor 3 and at 76e on the rod 85 of the sliding member 79—77—80 of distributor 71.

Moreover, element 70a of the linkage is provided with a handle 86, which constitutes a safety hand-control acting in parallel with the steering-wheel. The movable member 16 of the receiving diaphragm 9 is linked at 76f with element 70a through a connecting-rod 87, springs 88, 89 being provided to protect the receiving diaphragm against over stresses due to manual operation of handle 86.

With this arrangement, it is easy to see on the drawings that when the movable member 16 (or handle 86) is displaced e. g. towards the right, the linkage takes bearings on points 76 and 76e and displaces the sliding members 17 and 17a of distributor 3 also towards the right. The link between both distributors 3 and 71 has the advantages of opposing bouncing in distributor 3 and braking the sliding member. Similarly, if the sliding member 17 of distributor 3 is moved towards the left and kept in this position due to a high resisting torque applied on the rudder, chamber 73 is set into exhaust conditions and high pressure builds up in chamber 72 until spring 75 yields. The sliding member of valve 71 is then moved towards the right. Ducts 78 and 82 are opened and H. P. fluid is fed into spaces 20' and 21, while spaces 21' and 20 are exhausted. Pistons 5' and 5 are moved towards the left and the right respectively. The rudder is rotated clockwise and the linkage 70 to 70a brings back the sliding member 17 into the neutral position.

In other words, when an order has been emitted by the steering-wheel, distributor 3 causes a difference of pressure as a function of the aforesaid variables so that a variable L. P. or H. P. fluid flow is automatically switched on depending on the value of said function.

It will be easily understood that the pistons of both differential devices 61 and 71 should preferably have circular areas equal to twice their annular areas to ensure equivalent actions on either side of the neutral position of the rudder.

In this embodiment, the H. P. source has been duplicated to increase the security of the system. The second H. P. pump is shown at 45' and the second accumulator at 54'. Elements 59 and 59' are the usual non-return valves interposed between each one of said pumps and the corresponding accumulator.

Spaces 20' and 21', respectively, are connected in parallel to the H. P. accumulators 54, 54' through non-return valves 56, 55 and ducts 94, 95, 44f; 94, 95, 95a, 95b, respectively.

Further, a non-return valve 60 is provided between the H. P. accumulators 54, 54' and the pilot jack 61.

In order to increase the coefficient of security, manual controls must be provided to duplicate the action of any hydraulic control.

Between the steering-wheel 1 and the distributor 3, this manual control is constituted by the above described handle 86.

As shown in Fig. 2, a general manual control is further provided to feed directly jacks 4 and 4' with fluid pressure when the hydraulic follow-up system according to the invention does not operate for any reason.

Said general manual control comprises essentially a sliding valve 96, the sliding member 97 of which is actuated by a hand lever 98 pivoted at 99 on a stationary part and articulated at 100 on the rod 101 of said sliding member. The latter is provided with three active portions 102, 103, 104, respectively, controlling duct 26c leading to tank 110, a duct 105 from the H. P. sources and a duct 106 comunicating with duct 26c. Between the active portions 102 and 103 is provided a chamber 107 continuously communicating through a duct 108a with duct 23b and, thence, with spaces 20' and 21 of jacks 4' and 4. Similarly, a second chamber 108 continuously communicating through a duct 109a with duct 24a and, thence, with spaces 21' and 20 of jacks 4' and 4, is provided between the active portions 103 and 104.

With this arrangement, when the hand lever 98 is pivoted clockwise about point 99, H. P. pressure is fed into spaces 20' and 21 as follows: H. P. pumps 45—45', ducts 44—95—95a and ducts 44'—95a in parallel, duct 105, chamber 107, ducts 108a—23b, port 18, spaces 20'—21, while the fluid in spaces 21'—20 can be exhausted as follows: port 19, ducts 24b—24a—109a, chamber 108, ducts 106—26c, tank 110. The operation is similar, but reversed, when the hand lever 98 is pivoted anti-clockwise.

Cocks R1 and R2 are provided on ducts 23a, 24a, respectively, to cut off communication between jacks 4, 4' and the automatic follow-up system when desired.

Cocks R3 and R4 permit cutting off at will communication of the system with either or both H. P. sources 45, 45'.

Suitable display measuring apparatus such as selsyns (not shown) are preferably provided to control relative positions of the steering-wheel and rudder.

Finally, suitable means provided are for protecting the variable flow pump 22 against high pressure.

In the embodiment shown in Fig. 2, said means are constituted by two non-return valves 90, 91 opening in opposite directions and interposed in ducts 23, 24 respectively, said non-return valves being shunted by ducts 92, 93, respectively controlled by the end active portions 79, 80 of the sliding member of distributor 71, the arrangement being such that when said sliding member is moved towards the right as described above, the shunting duct 92 is closed so that the high pressure fluid which is then introduced into the corresponding chamber of the distributor has no way of communicating with pump 22. Similarly, as soon as the sliding member of distributor 71 is moved towards the left, the shunting duct 93 is closed so that non-return valve 91 prevents high pressure fluid from penetrating into pump 22.

The stabilization is obtained by operation of a pivoted member such as a flap 94 (Fig. 3), the shaft 2' of which has a function similar to that of the rudder shaft 2 of Figs. 1 and 2. Said shaft is controlled through a crank arm 7' from a differential jack 4 the piston 5 of which is linked with an articulation 6' on said crank arm through the usual connecting-rod 5'.

In Fig. 3, the distributor 3 without backlash has been shown in detail to show how its movable member 17a is balanced when pressure is admitted through duct 24a. This detailed view also shows how duct 24b can be put into communication with outlet 26, which is connected to tank 110 through ducts 26a and 26b through an axial passage 95' and radial holes 96' provided in the movable member 17a when the other movable member 17 is moved towards the left.

Pendulum 1' is pivoted at 90' and articulated at 97' on a rod 98' controlling through bellows 99' provided with a free opening 99'a another rod 100' slidably mounted at 101' and articulated at its end opposite to bellows 99', as indicated at 102' on a swing arm 103'. Swing arm 103' carries at two diametrically opposed points articulations 104' and 105' for two rods 106' and 107', respectively. Rod 107' is articulated at its free end, as indicated at 108', on a second pendulum 109' pivoted at 111 and carrying two mercury tiltable switches 112 and 113, respectively. Both mercury bulbs are continuously connected through a conductor 114 with the negative terminal of an electric current source such as a battery 115. The fixed contacts 116—117 of the mercury switch 112 are connected in parallel through a conductor 118, the operating coil 119 of an electromagnet and conductors 120, 121 with the positive terminal of battery 115.

One fixed contact 122 of the other mercury switch 113 is connected through a conductor 123 with the operating coil 124 of a second electromagnet and through conductors 125, 120, 121 with the positive terminal of battery 115. Similarly, the other fixed contact 126 of the second mercury switch 113 is connected through the operating coil 127 of a third electromagnet and through conductors 125, 120, 121 with the positive terminal of battery 115. The movable core 128 controlled by the first electromagnet coil 119 actuates through a swing arm 129 pivoted at 130 on a stationary part a rod 131 controlling the ball 40' of a valve 41' normally closed under the action of a spring 132. The movable cores 133, 134 respectively controlled by the second and third electromagnet coils 124, 127 are coupled to each other at their adjacent ends, so as to act in opposite directions, said coupled ends being articulated, as indicated at 135, at one end of a swing arm 136 articulated at its mid-point 137 on the rod 138 of the sliding member 17 of distributor 3. Rod 138 is slidably mounted in a guide 139. At its end opposite to articulation 135, the swing arm 136 carries the articulation 140 of one end of a rod 141, the other end of which is articulated at 142 at one end of a swing arm 160. Articulated at 106'a at the mid-point of arm 160 is the free end of rod 106'. The other end of arm 160 is articulated at 143 on a rod 144 slidably mounted in a guide 145. The rod 144 extends into a distributor 146 and mounts two active sliding portions 150, 151 which define three chambers 147, 148 and 149 in the distributor 146. Chamber 147 is continuously fed with low pressure fluid from pump 45' through ducts 23a and 44d and communicates continuously with the inlet 46 of distributor 3 through duct 24a. Chamber 148 is connected to tank 110 through duct 26b. Finally, chamber 149 continuously communicates with a chamber 152 in distributor 3 through duct 24b. The active portion 150 closes in its neutral position a duct 25 communicating with port 19 leading into the cylindrical space 21 of jack 4, the annular space 20 of which is continuously fed with low pressure fluid from pump 45' through ducts 23, 23a and port 18. The H. P. pump 45 communicates through duct 44a with the inlet of valve 41', the outlet of which communicates through a duct 44c with duct 44d feeding continuously, as stated above, the chamber 147 of the follow-up distributor 146.

The operation of this device is as follows:

When the normal equilibrium of the craft on which the device is mounted is disturbed, pendulum 1' is shifted by a given angle under the action of forces which are exerted on it due to its very nature.

In this particular embodiment, the follow-up system is responsive only to angular displacements of pendulum 1', when the same are effected at a speed exceeding a predetermined value.

This is due to the presence of opening 99'a in bellows 99' which is deformed without imparting a displacement to rod 100' when said angular displacements of pendulum 1' are slower than said predetermined speed, so that air has time enough to escape through said opening. On the other hand, the second pendulum 109' ensures the control of the follow-up system when shifted by a given angle, independently of pendulum 1' and, thence, whatever may be the speed at which said pendulum is shifted.

In other words, when the unbalance exceeds a given value the follow-up system is always responsive while, under said value, it is only responsive if the speed of the angular shift is higher than a predetermined value.

The two above described mercury switches are closed successively under the action of the forces which are exerted on the mercury due to its weight if pendulum 109' is shifted on either side of its resting position shown in Fig. 3 by a sufficient angle. Mercury switch 113 is the first to be closed and completes the operating circuit of either coil 124 or coil 127 according as whether pendulum 109' is shifted anti-clockwise or clockwise (either due to its own weight or through linkage 98', 99', 100', 103', 107' from pendulum 1'). When coil 124 is energized, core 133 is sucked in, so that, if articulation 140 remains stationary, the sliding members 17, 17a of distributor 3' are displaced towards the right through linkage 136, 138.

In these conditions, L. P. fluid is fed into the cylindrical chamber 149 of distributor 146 as follows: pump 45', ducts 23, 23a, 44d, chamber 147, duct 24a, inlet 46, chamber 152, duct 24b. The sliding member of distributor 146 is then differentially subjected to low pressure, so that its sliding member is displaced towards the left (assuming articulation 143 yields). The active portion 150 of said sliding member then opens duct 25, so that the fluid in space 21 of jack 4 can be exhausted as follows: port 19, duct 25, chamber 148, duct 26b, tank 110. Since the annular space 20 of jack 4 is continuously fed with low pressure, as previously explained, from pump 45' through ducts 23, 23a and port 18, piston 5 of said jack is displaced towards the left so that flap 94 is angularly shifted anti-clockwise through linkage 5'—7'. The relative arrangement of flap 94 and the pendulum system 1'—109' is such that the stabilizing action of flap 94 has for its effect to bring back pendulum 109' into the neutral position shown in Fig. 3.

If, now, pendulum 109' is shifted in opposite directions, coil 127 is energized, so that the sliding member 17 of the distributor 3 is displaced towards the left under the action of core 134 through linkage 136, 138 assuming as previously that articulation 140 is stationary. The fluid contained in chamber 149 of distributor 146 can then escape as follows: duct 24b, chamber 152, passages 95', 96', outlet 26, ducts 26a, 26b, tank 110. The sliding member of distributor 146 is then subjected to low pressure only on the annular area of the active portion 150, so that said sliding member is displaced towards the right (assuming, as previously, that articulation 143 yields).

The cylindrical space 21 of jack 4 is then fed with low pressure, as well as its annular space 20, as follows: pump 45', ducts 23, 23a, 44d, chamber 147, duct 25, port 19, so that piston 5, under the differential action of low pressure on its both faces is displaced towards the right. Thus, flap 94 is rotated clockwise through linkages 5'—7' now exerting its stabilizing action in a direction opposite to the previous one and bringing back pendulum 109' once more into neutral position.

On the other hand, if the angular shift of pendulum 109' in either direction exceeds a given angle, the mercury switch 112 is closed and operates coil 119, so that valve 41' is opened, its ball 40' being unseated by rod 131 actuated from core 128 through swing arm 129.

H. P. fluid is then fed into chamber 147 of distributor 146 as follows: pump 45, ducts 44, 44a, valve 41' (open), ducts 44c and 44d.

Now, as previously, according to whether the shift of pendulum 109 has taken place in one direction or in the other, chamber 149 of distributor 146 is also fed with high pressure through duct 24a, chamber 152, duct 24b, or put into communication with tank 110 through duct 24b, chamber 152, passages 95', 96', outlet 26 and duct 26a—26b.

In the first case, the sliding member of distributor 146 is shifted towards the left, under the differential action of high pressure and, in the other case, it is shifted towards the right, under the action of high pressure on the sole annular area of active portion 150.

In the first case, space 21 is exhausted as previously, so that piston 5 is displaced towards the left, under the action of high pressure in space 20 which also communicates with valve 41' through duct 23a—44d—44c. In the second case, piston 5 is displaced towards the right, under the diffrential action of high pressure, said pressure being brought into space 21 from chamber 147 through duct 25.

The device described above is thus responsive to four variables, viz: the amplitude of the angular shift of both pendula with respect to their supports, which is introduced by the mercury switches and/or said pendula; the speed of said angular shift and re-setting to normal position, which is introduced by the bellows; the acceleration of said shift and resetting, which is introduced by dimension of opening of the three-way distributor without backlash and the variation of said acceleration versus time, which is introduced by the differential distributor.

It is to be understood that the invention is not intended to be limited to the embodiments shown in the drawings, nor otherwise than defined in the appended claims. In particular, instead of using one single differential valve following up a distributor without backlash for controlling both pressure fluid sources as shown, it is possible to provide, within the scope of the invention, two separate differential valves following up the controlling element, either through a common distributor without backlash separately controlling said sources, or through a direct linkage; the second source controlling valve only switching on the latter when the difference of pressure built up by the distributor without backlash exceeds a predetermined value. However, in order to make the construction simpler, both valves are preferably combined and preferably follow up the controlling element through a distributor without backlash which, acting as a pilot means, reduces the strain on the linkage e. g. as shown in Fig. 2.

What is claimed is:

1. A hydraulic follow-up system comprising a controlling element, a swing-bar, two opposed double-acting hydraulic jacks having their piston rods articulated at respective ends of said swing-bar, a variable flow pump, a three-way distributor without back-lash, a differential distributor having a movable member adapted to be actuated under the action of the difference of pressure between a cylindrical chamber and an annular chamber and against the action of spring means, an inlet, two outlets and two additional chambers, each one of which continuously communicates with one side of said variable flow-pump, with the annular chamber of one of said jacks and with the cylindrical chamber of the other one of said jacks, said movable member closing in its normal position said inlet and outlets and being adapted to set, when displaced in either direction from said normal position, said inlet into communication with one of said additional chambers and the other one of said additional chambers into communication with one of said outlets, a differential jack the piston of which is operatively connected with the flow-varying member of said variable-flow pump, a high pressure pump, feeding ducts from said high pressure pump into the annular chamber of said differential jack, to the inlets of said distributors and into the annular chamber of said differential distributor, ducts communicating the cylindrical chamber of said differential distributor with the cylindrical chamber of said differential jack and with the take-off port of said three-way distributor and connecting means between said controlling element, swing-bar, three-way distributor movable members and differential distributor movable member.

2. A hydraulic follow-up system according to claim 1, in which a hydro-pneumatic accumulator is directly fed from said high pressure pump and in which suitable non-return valves are interposed in the feeding ducts from said high pressure pump and in the duct between said high pressure pump and said accumulator.

3. A hydraulic follow-up system according to claim 2, in which each pair of opposed chambers of said opposed jacks is returned to said high pressure accumulator through a non-return valve so calibrated as to yield only for a given pressure in said chambers.

4. A hydraulic follow-up system according to claim 1, further comprising a second high pressure pump and hand-actuated means to communicate said first and second high pressure pumps with the opposed chambers of said jacks, valve means being further provided to interrupt communication between said jacks and said differential distributor and to interrupt the feeding ducts from each high pressure pump.

5. A hydraulic follow-up system according to claim 1, in which a hydro-pneumatic accumulator is directly fed from said second high pressure pump.

6. A hydraulic follow-up system according to claim 1, in which means are provided to indicate the positions of said controlling element and swing-bar.

7. A hydraulic follow-up system comprising a controlling element, a controlled element, a hydraulic prime mover operatively connected with said controlled element for actuation of the same in one of two ways upon flow of fluid through a circuit in one of two directions, a variable-flow pump, a three-way distributor without backlash, a differential distributor having a movable member adapted to be actuated under the action of the difference of pressure between a cylindrical chamber and an annular chamber and against the action of spring means, an inlet, two outlets and two additional chambers, each one of which continuously communicates with one side of said variable-flow pump and with one end of said circuit, said movable member closing in its normal position said inlet and outlets and being adapted to set, when displaced in either direction from said normal position, said inlet into communication with one of said additional chambers under cut-off of communication from said additional chamber towards said variable-flow pump, but not vice-versa, and the other one of said additional chambers into communication with one of said outlets, a differential jack the piston of which is operatively connected with the flow-varying member of said variable flow-pump, a high pressure fluid source, feeding ducts from said source into the annular chamber of said differential jack, to the inlets of said distributors and into the annular chamber of said differential distributor, ducts communicating the cylindrical chamber of said differential distributor with the cylindrical chamber of said differential jack and with the take-off port of said three-way distributor and connecting means between said controlling element, controlled element, three-way distributor movable members and differential distributor movable member.

8. A hydraulic follow-up system comprising a controlling element, a controlled element, a hydraulic prime mover operatively connected with said controlled element for actuation of the same in one of two ways upon flow of fluid through a circuit in one of two directions, a variable-flow pump, a three-way distributor without backlash, a differential distributor having a movable member adapted to be actuated under the action of the difference of pressure between a cylindrical chamber and an annular chamber and against the action of spring means, an inlet, two outlets, and two additional chambers, each one of which continuously communicates with one side of said variable-flow pump and with one end of said circuit, said movable member closing, in its normal position, said inlet and outlets, and being adapted to set, when displaced in either direction from said normal position, said inlet into communication with one of said additional chambers under cut-off of communication from said additional chamber towards said variable-flow pump but not vice-versa, and the other one of said additional chambers into communication with one of said outlets, a differential jack the piston of which is operatively connected with the flow-varying member of said variable-flow pump, a source of pilot pressure fluid, feeding ducts from said source into the annular chambers of said differential jack and differential distributor and to the inlet of said three-way distributor, a high pressure fluid source, a feeding duct between the same and said differential distributor inlet, ducts communicating the cylindrical chamber of said differential distributor with the cylindrical chamber of said differential jack and with the take-off port of said three-way distributor, and connecting means between said controlling element, controlled element, three-way distributor movable members and differential distributor movable member.

9. A hydraulic follow-up system comprising a controlling element, a controlled element, a hydraulic fluid motor operatively connected with said controlled element, a first source of operating pressure fluid, a second source of operating pressure fluid, a source of fluid under a pilot pressure of predetermined initial value, pilot valve means having a movable system, to either increase or decrease said pilot pressure initial value in response to and as a function of positional disagreement between said controlling element and controlled element, distributor valve means having a movable system, responsive to the instantaneous value of said pilot pressure to selectively feed said hydraulic fluid motor with operating fluid from said first or said second source, according to whether the difference between said instantaneous value and said initial value is lower or higher than a predetermined extent, and connecting means between said controlling element, controlled element and valve means movable systems.

10. A hydraulic follow-up system according to claim 9, wherein said source of pilot pressure fluid is constituted by said second operating fluid source.

11. A hydraulic follow-up system comprising a controlling element, a controlled element, a hydraulic fluid motor operatively connected with said controlled element, a first and second source of fluid under pressure including a hydraulic accumulator, valve means to feed said hydraulic fluid motor with fluid from said sources, in response to positional disagreement between said controlling element and said controlled element, a duct to return fluid from said fluid motor to said accumulator and a spring-loaded non-return valve in said duct so calibrated as to yield only for a given high pressure in said fluid motor.

References Cited in the file of this patent

UNITED STATES PATENTS

| | | |
|---|---|---|
| 66,093 | Leach | June 25, 1867 |
| 243,450 | Lafargue | June 28, 1881 |
| 439,763 | Purvis | Nov. 4, 1890 |
| 1,103,036 | Clark | July 14, 1914 |
| 1,353,656 | Heisler | Sept. 21, 1920 |
| 2,345,531 | De Ganahl | Mar. 28, 1944 |